Figure 10:
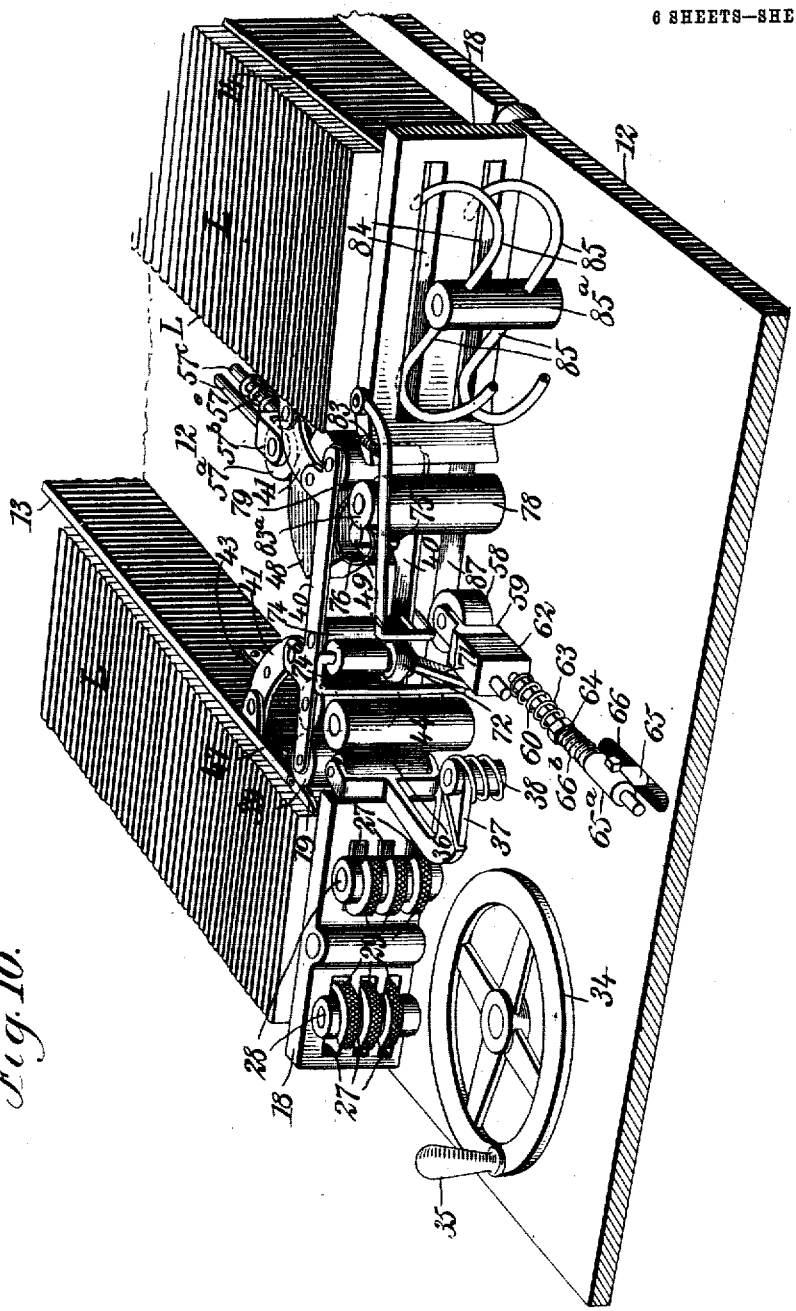

No. 813,809.
PATENTED FEB. 27, 1906.
W. G. MAYNARD.
CANCELING MACHINE.
APPLICATION FILED OCT. 13, 1904.
6 SHEETS—SHEET 1.
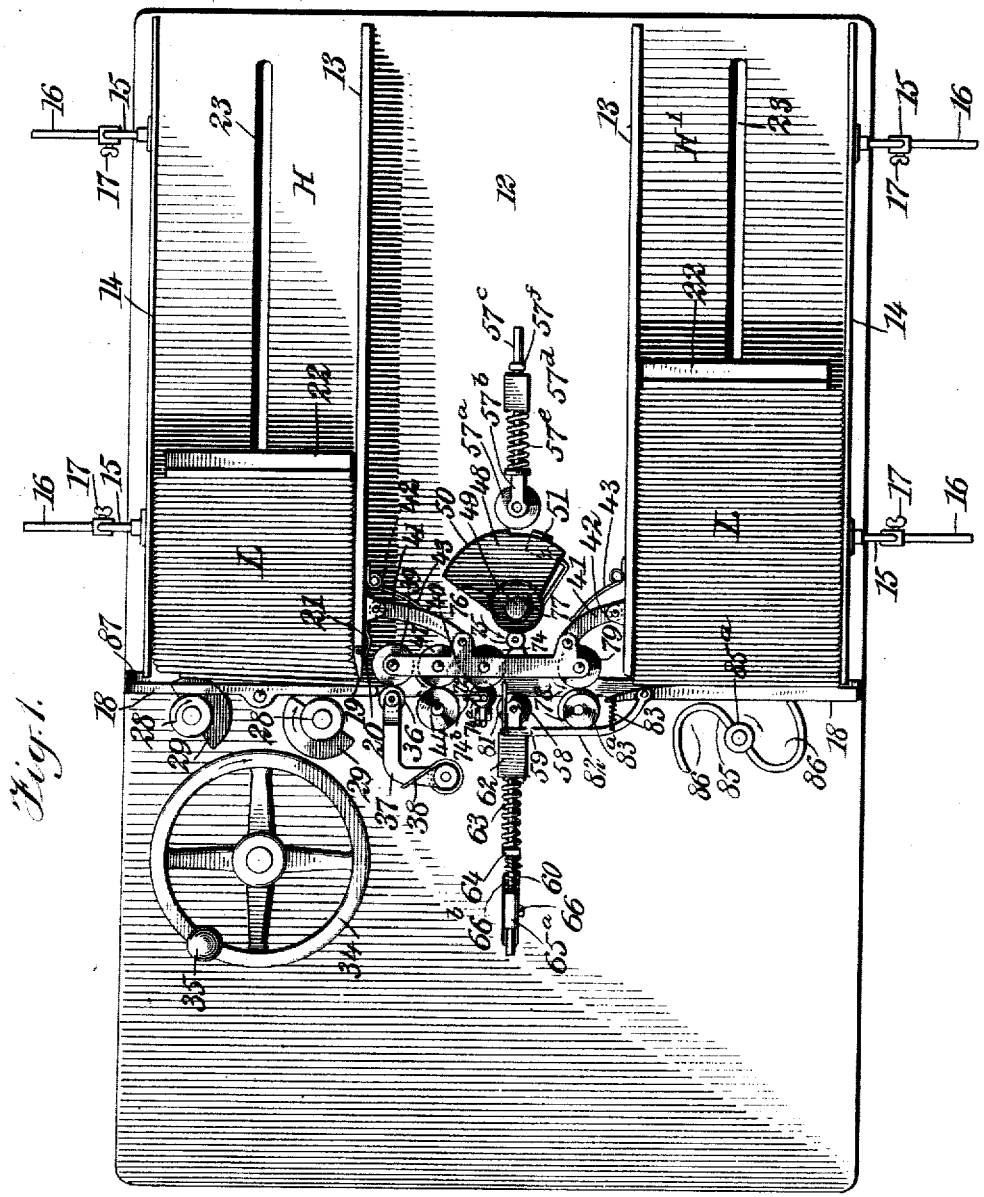
WITNESSES:
INVENTOR
William G. Maynard
BY
ATTORNEYS No. 813,809. PATENTED FEB. 27, 1906.
W. G. MAYNARD.
CANCELING MACHINE.
APPLICATION FILED OCT. 13, 1904.
6 SHEETS—SHEET 2.
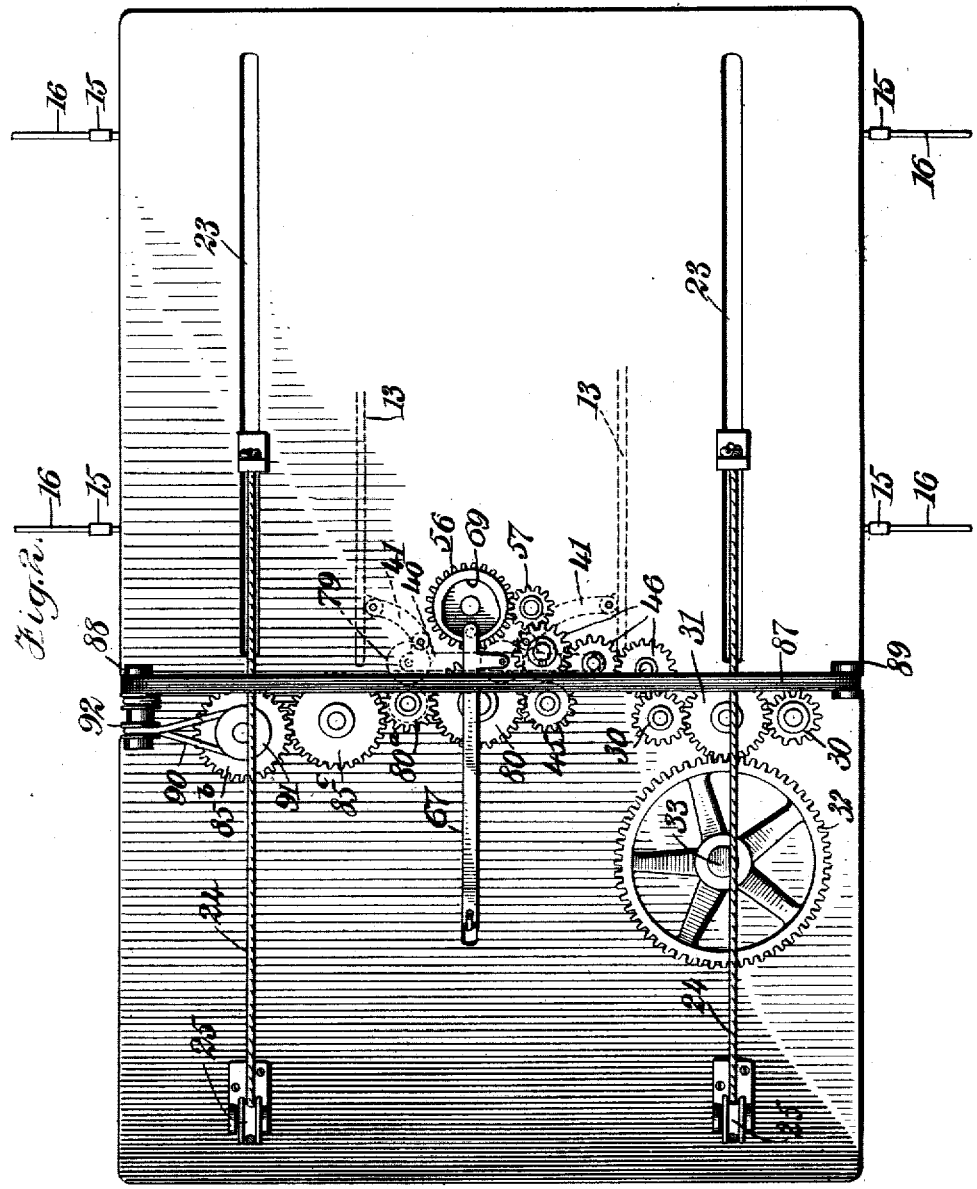
WITNESSES:
INVENTOR
William G. Maynard
BY
ATTORNEYS

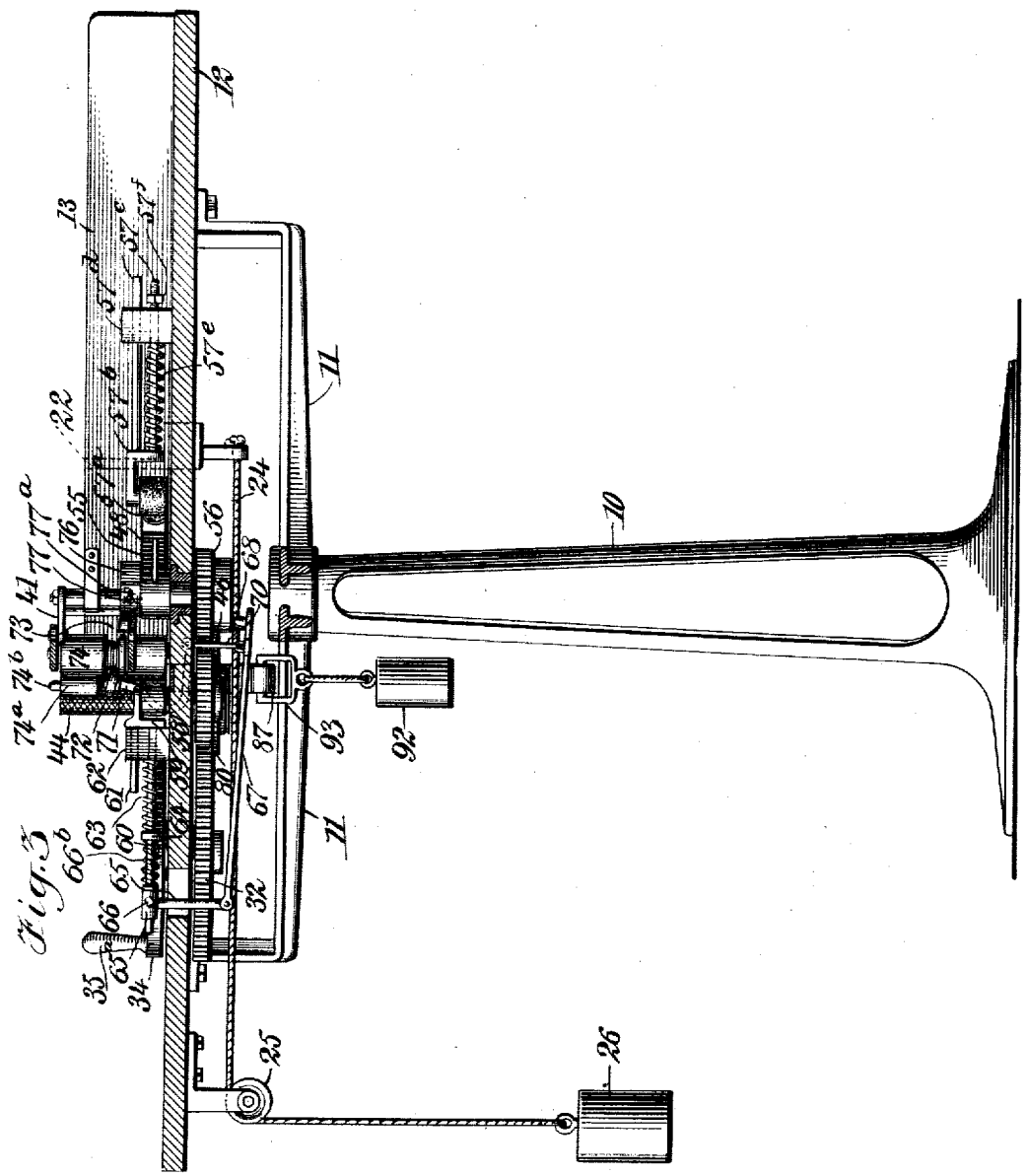

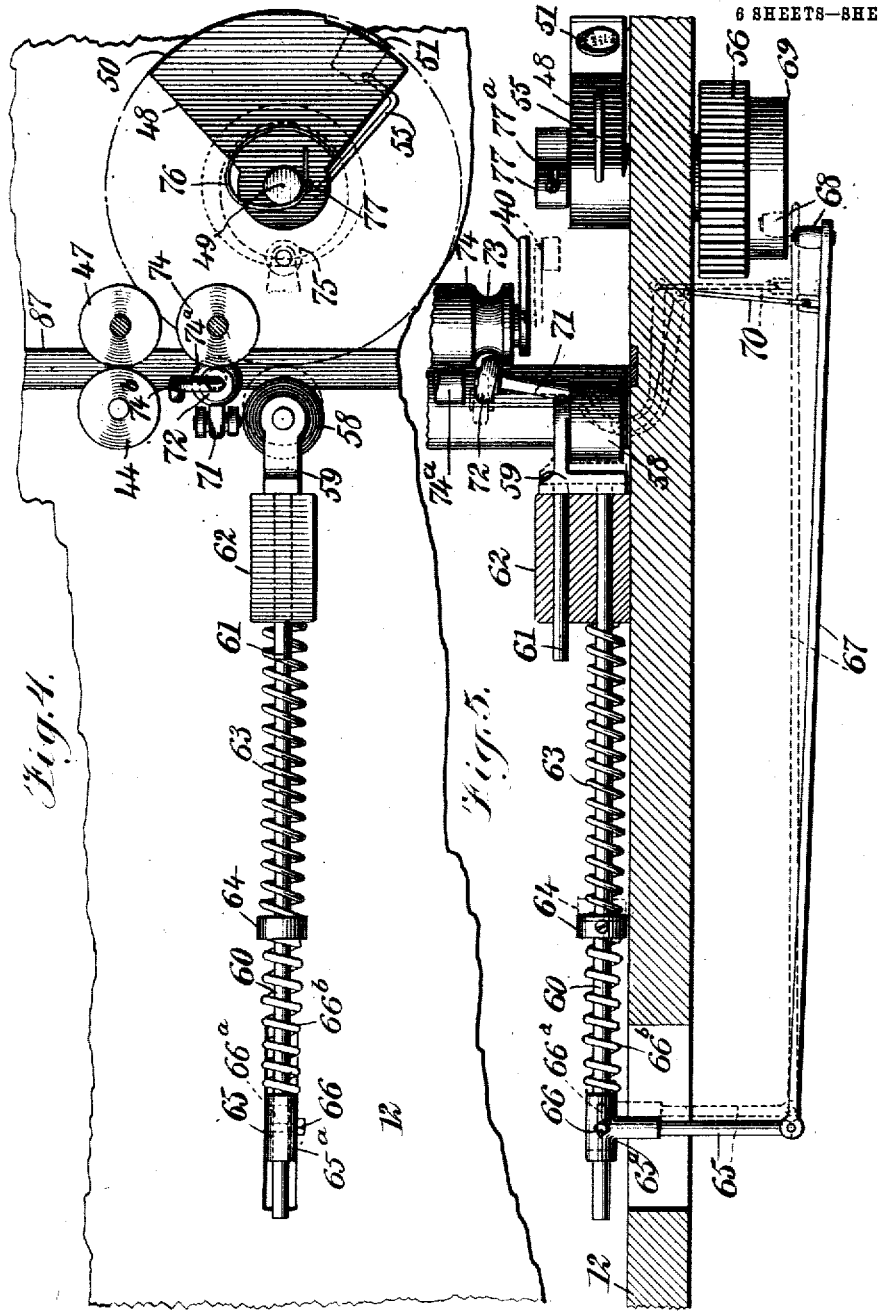

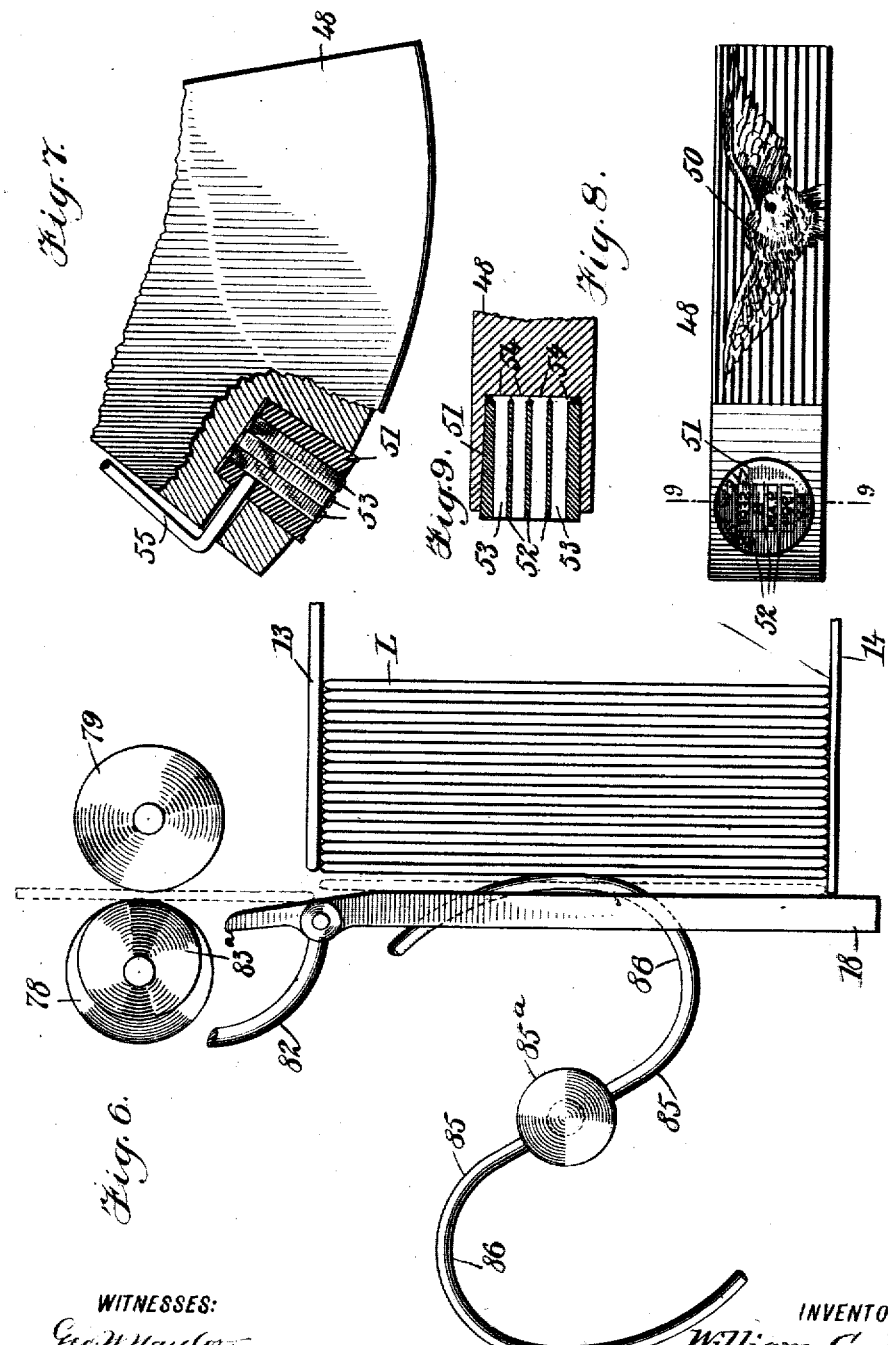

No. 813,809. PATENTED FEB. 27, 1906.
W. G. MAYNARD.
CANCELING MACHINE.
APPLICATION FILED OCT. 13, 1904.

6 SHEETS—SHEET 6.

WITNESSES:

INVENTOR
William G. Maynard
BY
ATTORNEYS

UNITED STATES PATENT OFFICE.

WILLIAM G. MAYNARD, OF RONDOUT, NEW YORK.

CANCELING-MACHINE.

No. 813,809.   Specification of Letters Patent.   Patented Feb. 27, 1906.

Application filed October 13, 1904. Serial No. 228,360.

*To all whom it may concern:*

Be it known that I, WILLIAM G. MAYNARD, a citizen of the United States, and a resident of Rondout, in the county of Ulster and State of New York, have invented a new and Improved Canceling-Machine, of which the following is a full, clear, and exact description.

My invention relates to machines for canceling stamps affixed to mail-matter, its principal object being to furnish an effective apparatus for this purpose.

It consists in the various features and combinations hereinafter described, and more particularly claimed.

Reference is to be had to the accompanying drawings, forming a part of this specification, in which similar characters of reference indicate corresponding parts in all the figures.

Figure 1 is a top plan view of one embodiment of my invention. Fig. 2 is a bottom plan view thereof. Fig. 3 is a vertical longitudinal section therethrough. Figs. 4 and 5 are details in top plan and in vertical section, respectively, of the mechanism for operating the impression member. Fig. 6 is a detail in top plan of the receiving portion of the machine. Fig. 7 is a broken detail of the edge of the die. Fig. 8 is an edge elevation thereof. Fig. 9 is a sectional detail on the line 9 9 of Fig. 8, and Fig. 10 is a perspective view of the machine.

10 designates a suitable standard, upon the top of which are shown radiating arms 11, supporting a base-board 12. At one side of this board is a supply-holder H, which may consist of an inner fixed side wall 13 and an opposite movable side wall 14, this latter being preferably held in place by brackets 15, secured thereto and having openings through which extend rods 16, projecting from the sides of the base-board. The brackets may be retained in place upon the rods by set-screws 17, threaded through said brackets and engaging the rods. At the inner extremity of the supply-holder is an end wall 18, there being between this and the fixed wall 13 a space into which extends a movable member 19, furnishing a continuation of the wall. This member is illustrated as pivoted at 20 and normally maintained in alinement with the wall by a spring 21. The inner face of the movable member is preferably outwardly inclined, causing the letters or other matter L, which are arranged within the holder and which are in contact with it, to assume a jogged or overlapping position, so that they may be more readily separated. Within the holder operates a pressure-head 22, having a depending portion extending through a slot 23 through the base-board, lying longitudinally of the holder. To the depending portion is connected a cord or flexible member 24, passing over a pulley 25, suitably journaled beneath the board and having at its lower or free end a weight 26. As the letters are gradually removed from the holder, the weight maintains the head in contact with the outer one, and the entire pack is forced toward the end wall.

Through the wall 18 are openings, (here shown as in the form of two sets of parallel slots 27,) through which project feeding members. These may consist of wheels 28 28, having their supporting-shafts journaled in the board and with raised peripheral portions 29 movable through the slots and roughened to engage the letters. Each of the feeding-wheels is preferably cut away or mutilated, leaving a substantially semicircular portion, these being oppositely arranged upon the two wheels so that they come successively into coaction with the letters. This permits a short envelop at the outer side of the holder to be moved by the first of the wheels into the field of action of the second, and thus insures its feeding. The wheels may be rotated by pinions 30, connected by an intermediate gear 31, with which meshes a main driving-gear 32, fixed upon a shaft 33, extending up through the board and carrying a fly-wheel 34. This may be rotated by a handle 35, as illustrated, or power may be applied from an electric motor or any other convenient source.

From the holder the feed-wheels deliver the letters to guide-rolls, one of which, (designated as 36,) is shown as journaled upon an arm 37, pivoted upon the board and held in engagement by a spring 38 with its companion roll 39. This last-named roll is preferably mounted upon a frame consisting of upper and lower bars 40 40, carried by a pair of arms 41, pivoted to the side 13 of the holder. In each of these arms at one of its pivotal connections with the holder is a slot 42, through which the pivot-pin may play to allow a yield of the frame. The frame and roll are forced toward the companion roll by springs 43, which are here shown as contacting with the arms. These guide-rolls direct the letters to a pair of feeding-rolls. Of these that designated as 44 is journaled upon the board and the other roll 47 is mounted upon the bars 40. These rolls are operated by means of the pinion 45 and the train of gearing 46 from the inner pinion 30.

The feeding-rolls advance the matter to canceling mechanism, which may consist of a sector-shaped die 48, fast upon a shaft 49 and having a raised portion 50 at one side of its periphery, upon which may be inscribed a suitable design for canceling the stamps. Beyond this is a dating portion formed by a recess, in which is seated a carrier 51, having openings through it separated by walls 52. These openings receive movable type 53, having at their inner ends heads or enlargements 54, which, contacting with the walls, prevent outward movement, while their engagement with the bottom of the die-recess holds them from being pressed inwardly. The carrier may be locked within the die by a spring 55, having an angular end adapted to extend through an opening communicating with the recess and there engaging a depression in the carrier. The die is shown as rotated by a gear 56 through an intermediate pinion 57 from the train 46. Ink may be supplied to the printing-surface by an absorbent roll 57$^a$, journaled upon a head 57$^b$, supported by rods 57$^c$ 57$^c$, operating through openings in a block 57$^d$. The inking-roll is preferably normally pressed toward the die by a spring 57$^e$, surrounding one of the rods and interposed between the head and block, and the movement limited by a nut 57$^f$, threaded upon the outer end of one of the rods.

As a platen or member to support the letter while it is receiving the impression a roll 58 is provided, journaled in a frame 59, carried by a main rod 60 and a guide-rod 61, sliding through openings in a block 62. The impression-roll is normally held out of contact with the die as it rotates by a spring 63, contacting with the block and with a collar 64, fast upon the rod 60. With this impression-roll is associated operating mechanism, which may comprise an arm 65, adjustably secured upon the rod 60 by a fitting 65$^a$, having a pin 66, passing through a slot 66$^a$ in the rod, the outer end of the slot being held normally in contact with the pin by a spring 66$^b$ interposed between the fitting and collar. To the lower end of the arm is pivoted a rod 67, carrying at its outer end a projection which may be surrounded by a roll 68. This roll may coact with an internal cam 69, conveniently carried by the gear 56.

The contour of the cam-surface and the relation of the elements is such that when the roll upon the rod projection is in contact with the cam-surface it will draw up the impression-roll, as is indicated in dotted lines in Figs. 4 and 5 of the drawings, so that the letter passing over it will receive the imprint of the die. The spring 66$^b$ is stronger than the spring 63, so that it is not materially compressed by the forward movement of the impression-roll, yet it permits a yield of said roll under the pressure of the die by virtue of the slot-and-pin connection between the rod and arm. To control this movement so that the impression-roll will be held in its operative position only when a letter is passing over it, thus avoiding the contact of the die with the face of the roll itself, (a condition which would result in the smearing of the back of the succeeding letters,) the rod 67 is connected by a link 70 with a lever 71, operating through a slot in the base-board and pivoted thereon. The upper end of this lever has a projection, preferably in the form of a roll 72, which extends into the path of the letters and normally lies within an annular groove 73 in a roll 74, carried by the frame-bars 40. Opposite the roll 74 is a companion guide-roll 74$^a$, rotatable about an arm 74$^b$, rising from the board. As the letter is pressed by the feed-rolls against this controlling-roll the latter is moved away from its companion, swinging the lever to raise the projection on the rod 67 into the cam, which then operates to advance the impression-roll to its active position. After the die has canceled the stamp a portion of the cam of maximum diameter removes the tension from the rod and permits it to drop, the controlling-roll assuming its position in the groove of the roll 74.

To insure the advance of the matter as the die begins its action, the bars 40 carry a contact member or roll 75, with which coacts a revoluble contact member, conveniently consisting of a spiral spring 76, carried by the shaft of the die. The formation of this spring is preferably such that just as the surface of the die is approaching contact with the letter said spring strikes the roll, forcing the frame and the movable feed-rolls against their companions, giving additional pressure. If the tension of the springs 43 were sufficient to secure this force of coaction at all times, it might be too great during other portions of the operation, and by the above-described contact members the action is localized. To vary the pressure which the spring exerts, it may be mounted upon the shaft by a screw 77, extending through a longitudinal slot 77$^a$, this permitting the contact portion of the spring to be moved toward and from the shaft.

Beyond the canceling mechanism are feed and guide rolls 78 and 79, the former being journaled upon the base-board and rotated by a gear 80 and pinion 80$^a$ from the pinion 45, while the roll 79 is mounted upon the frame with the other pressure-rolls. These rolls 78 and 79 receive the letter from the canceling mechanism and continue its advance.

To determine the position of the letter with relation to the die, so that the imprint shall fall in the correct position, a gate 81 is preferably placed adjacent to the impression-roll and on the delivery side, it conveniently consisting of separated fingers projecting from the end of an intermittently-operating bar 82, which is pivoted at its opposite end at some point upon the board. This bar is held by a spring 83 into contact with the periphery of an eccentric 83ª, which is here shown as carried by the upper end of the feed-roll 78. This eccentric and the connecting gearing are so related that at the proper time the gate against which the letter to be operated upon has been pressed by the feed-rolls on the delivery side will be withdrawn and said letter carried forward to the impression-roll to be subjected to the action of the die.

At the opposite side of the die mechanism from the delivery-holder is a receiving-holder H', which may be arranged in precisely the same manner. In its end wall are openings or slots 84, through which project means for facilitating the introduction of letters by the feed-rolls 78 and 79. This preferably consists of arms 85, mounted upon a spindle 85ª, rotated by a gear 85ᵇ from the pinion 80ª through an intermediate gear 85ᶜ. The arms are here shown as two in number, and each is curved in such a manner that it presents an outer face which will press the accumulating letters away from the wall, and an intermediate space 86, which will receive the following letter. After the feed-rolls have forced the letter into this space its movement into alinement with those preceding it will be accomplished by the contact of the following arm, which will simultaneously force the pack away from the wall to allow the introduction of the next letter.

Extending from side to side of the base-board at the forward ends of the holders and beneath the meeting points of the pairs of rolls is a groove through which runs an endless conveyer 87, carried upon pulleys 88 89, mounted beneath the board and caused to advance at its upper side from the delivery to the receiving holder by a belt 90, extending over a pulley 91, rotatable with the gear 85ᵇ, and over a pulley 92, connected with the pulley 88. The belt may be tightened by a weight 92, suspended upon its lower run by a suitable loop 93. This aids in advancing the letters from one side of the machine to the other.

In using the machine the letters to be operated upon are placed in the delivery-holder, with the stamps all turned in one direction and situated at the lower edges. Then upon rotating the main driving-gear the feed-wheels successively advance the letters between the guide-rolls until they are seized by the feed-rolls. These move them along against the gate, which is then withdrawn, and the controlling-roll being pressed out causes the operating mechanism to bring up the impression-roll as each stamp passes over it, where it receives the imprint of the die, which at the same time places the name of the canceling-office and the date upon the envelop. The second pair of feed-rolls now brings the letters under the influence of revoluble arms, which introduce them into the receiving-holder, from which they are removed when desired.

Having thus described my invention, I claim as new and desire to secure by Letters Patent—

1. In a canceling-machine, the combination with a die, of an impression member, rolls between which the matter to be canceled passes, one of the rolls being movable from its companion roll by the matter to be canceled, a lever controlled by said movable roll, a cam, a rod coacting with the cam and connected with the impression member, and a link connecting the lever and rod.

2. In a canceling-machine, the combination with a die, of an impression member, rolls between which the matter to be canceled passes, one of the rolls being movable from its companion roll by the matter to be canceled, a lever controlled by the said movable roll, a cam, a rod coacting with the cam and adjustably connected with the impression member, and a link connecting the lever and rod.

3. In a canceling-machine, the combination with a die, of an impression member, a guide-roll having a groove, a controlling member movable in the groove, and operating mechanism connected with the controlling member and with the impression member.

4. In a canceling-machine, the combination with a die, of an impression member, a guide-roll having a groove, a lever provided with a roll coacting with the groove, and operating mechanism connected with the lever and with the impression member.

5. In a canceling-machine, the combination with feed-rolls and canceling mechanism including an impression-roll, of a pivoted and spring-pressed bar, a gate consisting of a plurality of fingers projecting from the end of the bar adjacent to the impression-roll and on the delivery side, and an eccentric rotatable with the feed-rolls and engaging said bar.

6. In a canceling-machine, the combination with a canceling mechanism, of feed-rolls for feeding the articles to the canceling mechanism, feed-rolls for feeding the articles from the canceling mechanism, one of the last-named rolls being provided with an eccentric, a pivoted and spring-pressed bar engaged by the eccentric, and a gate carried by the bar and arranged between the canceling mechanism and the rolls which feed the articles to the canceling mechanism.

7. In a canceling-machine, the combination with a supply-holder and a receiving-holder spaced apart, and a canceling mechanism between the holders, of feed and guide rolls, a support for sundry of the guide and feed rolls, said support being pivotally mounted upon the said holders.

8. In a canceling-machine, the combination with a supply-holder and a receiving-holder spaced apart, and a canceling mechanism between the holders, of feed and guide rolls, a support for sundry of said rolls, links pivotally connecting the support with the holders, and springs engaging the links.

9. In a canceling-machine, the combination of a movable support, and feed and guide rolls mounted in said support, a canceling mechanism, and means carried by the canceling mechanism for engaging the support, whereby the said rolls will be made to contact with their companion rolls with increased pressure.

10. In a canceling-machine, the combination of a yieldingly-mounted support having a projection, feed and guide rolls mounted in the support, a canceling mechanism, and means carried by the die of the canceling mechanism for engaging the projection of the support, for forcing the said rolls into engagement with their companion rolls for the purpose set forth.

11. In a canceling-machine, the combination with canceling mechanism, of coacting feed-rolls, means for forcing the feed-rolls toward one another, and means for intermittently increasing the pressure.

12. In a canceling-machine, the combination with canceling mechanism, of coacting feed-rolls, means for forcing the feed-rolls toward one another, and means carried by the canceling mechanism for intermittently increasing the pressure.

13. In a canceling-machine, the combination with a movable die, of coacting feed-rolls, and a revoluble spring movable with the die and coöperating with the feed-rolls.

14. In a canceling-machine, the combination with a movable die, of coacting feed-rolls, a revoluble spring movable with the die and coöperating with the feed-rolls, and means for adjusting the position of the spring upon the die.

15. In a canceling-machine, the combination of feed-rolls, a movable spring-pressed support for one of the feed-rolls, a movable die, and a spring carried by the die and adapted to engage the movable support of the feed-roll.

16. In a canceling-machine, the combination with a die, of a yieldingly-mounted support, an impression-roll carried by the support, means for operating the die, a cam operated by the die-operating means, and a rod pivotally connected with the said support and provided with a projection engaging the cam.

17. In a canceling-machine, the combination with a die, of a yieldingly-mounted support, an impression-roll carried by the support, means for operating the die, a cam operated by the die-operating means, a rod pivotally connected with the support and provided with a projection for engaging the cam, the projection of the rod being normally out of engagement with the cam, and means controlled by the matter to be canceled for operating the rod to bring its projection into engagement with the cam.

18. In a canceling-machine, the combination of a die, a spring-pressed frame, an impression-roll carried by the frame, an arm loosely connected with the frame, a rod pivoted to the arm and provided with a roller at its free end, a cam with which the roller of the arm engages, a lever movable by the matter to be canceled, and a connection between the free end of the lever and the rod.

19. In a canceling-machine, the combination of a die, an impression member mounted in a movable support, rolls between which the matter to be canceled passes, one of the rolls being movable from its companion roll, a lever operated by said movable roll, a cam operated by the die-operating means, a rod having one end pivotally connected with the support of the impression member and provided at the other end with a projection for engaging the cam, and a link connecting the said lever and rod.

20. In a canceling-machine, the combination of a die, means for operating the die, a spring-pressed frame, an impression-roll carried by the frame, an arm loosely connected with the frame, a rod pivoted to the arm and provided with a roller at its free end, a cam operated by the operating means and with which the projection of the rod engages, rolls between which the matter to be canceled passes, one of the rolls being movable from its companion roll, a lever operated by the movable roll, and a link connecting the lever and rod.

In testimony whereof I have signed my name to this specification in the presence of two subscribing witnesses.

WILLIAM G. MAYNARD.

Witnesses:
M. H. MAYNARD,
JOHN J. TONSKEY.